United States Patent
Lu et al.

(10) Patent No.: US 10,387,633 B2
(45) Date of Patent: Aug. 20, 2019

(54) PUSH AUTHENTICATION WITH VOICE INFORMATION FOR MOBILE TERMINALS

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 15/671,028

(22) Filed: Aug. 7, 2017

(65) Prior Publication Data
US 2017/0337366 A1    Nov. 23, 2017

Related U.S. Application Data

(63) Continuation of application No. PCT/CN2016/073107, filed on Feb. 1, 2016.

(30) Foreign Application Priority Data

Feb. 13, 2015 (CN) .......................... 2015 1 0077143

(51) Int. Cl.
G10L 17/24 (2013.01)
G06F 21/32 (2013.01)
(Continued)

(52) U.S. Cl.
CPC .............. *G06F 21/32* (2013.01); *G06F 21/33* (2013.01); *G06F 21/62* (2013.01); *G10L 17/24* (2013.01);
(Continued)

(58) Field of Classification Search
CPC ....... G10L 17/005; G10L 17/22; G10L 17/24; G06F 21/32; H04L 9/0866; H04L 9/3231; H04L 9/3271
(Continued)

(56) References Cited

U.S. PATENT DOCUMENTS 7,624,270 B2 * 11/2009 Pathan ................... H04L 63/08
                                                                 713/171
8,619,757 B2 * 12/2013 Shaheen ............... H04L 51/066
                                                                 370/352
(Continued)

FOREIGN PATENT DOCUMENTS

CN    102611793 A    7/2012
CN    102780674 A    11/2012
(Continued)

OTHER PUBLICATIONS

International Search Report of corresponding International PCT Application No. PCT/CN2016/073107, dated Apr. 20, 2016.
(Continued)

*Primary Examiner* — Martin Lerner
(74) *Attorney, Agent, or Firm* — J.C. Patents

(57) ABSTRACT

Disclosed is a working method of a voice authentication system and a device. The method includes that: an application server sends user information sent by an application interface and a stored application name to an authentication server; the authentication server generates a push authentication request according to a generated challenge value, the user information and the application name and sends the push authentication request to a mobile terminal token; the mobile terminal token generates voice information, collects the voice response of user, generates a first response value according to the challenge value and sends the challenge value to the authentication server when determining that logon is authorized; the authentication server generates a second response value, returns successful authentication when two response values are identical. The invention prevents click errors caused by mistaken operations, and is convenient to remind user of current information, avoids authentication delay and enhances security.

15 Claims, 12 Drawing Sheets

(51) Int. Cl.
  *H04L 29/06* (2006.01)
  *G06F 21/62* (2013.01)
  *G06F 21/33* (2013.01)
  *H04L 9/32* (2006.01)

(52) U.S. Cl.
  CPC .......... *H04L 9/3215* (2013.01); *H04L 9/3231* (2013.01); *H04L 9/3234* (2013.01); *H04L 29/06* (2013.01); *H04L 63/0861* (2013.01); *H04L 63/10* (2013.01); *G06F 2221/2103* (2013.01)

(58) Field of Classification Search
  USPC ....... 704/270, 270.1, 273; 726/4, 5; 713/168
  See application file for complete search history.

(56) References Cited

U.S. PATENT DOCUMENTS

| | | | | |
|---|---|---|---|---|
| 8,752,146 | B1 | 6/2014 | Van Dijk et al. | 726/6 |
| 9,021,565 | B2* | 4/2015 | Novack | H04L 9/3231 713/186 |
| 9,220,051 | B2* | 12/2015 | Damola | H04L 29/12066 |
| 9,343,070 | B2* | 5/2016 | Lu | H04L 63/08 |
| 9,402,181 | B1* | 7/2016 | Yi | H04W 12/06 |
| 9,654,469 | B1* | 5/2017 | Yang | H04L 63/0861 |
| 2005/0102501 | A1* | 5/2005 | Haukka | H04L 29/06 713/155 |
| 2005/0238171 | A1* | 10/2005 | Chen | H04L 63/08 380/270 |
| 2006/0256961 | A1* | 11/2006 | Brainard | G06F 21/31 380/44 |
| 2007/0150726 | A1* | 6/2007 | Sinnreich | H04L 29/06027 713/156 |
| 2008/0260149 | A1* | 10/2008 | Gehrmann | G06Q 20/3821 380/247 |
| 2009/0055892 | A1* | 2/2009 | Lu | H04L 9/3226 726/2 |
| 2010/0278112 | A1* | 11/2010 | Morimoto | H04W 8/082 370/328 |
| 2012/0042160 | A1* | 2/2012 | Nakhjiri | H04L 9/0844 713/151 |
| 2012/0185696 | A1* | 7/2012 | Lortz | G06F 21/43 713/175 |
| 2012/0242459 | A1* | 9/2012 | Lambert | H04L 9/3271 340/10.3 |
| 2013/0097682 | A1* | 4/2013 | Zeljkovic | H04L 9/3231 726/7 |
| 2013/0117382 | A1* | 5/2013 | Gaddam | H04L 67/26 709/206 |
| 2013/0179692 | A1* | 7/2013 | Tolba | H04L 63/08 713/179 |
| 2014/0075515 | A1* | 3/2014 | McColgan | H04L 67/26 726/4 |
| 2014/0250512 | A1* | 9/2014 | Goldstone | G06F 21/313 726/6 |
| 2014/0279514 | A1* | 9/2014 | Sharp | G06Q 20/40145 705/44 |
| 2015/0046990 | A1* | 2/2015 | Oberheide | G06F 21/32 726/6 |
| 2015/0139424 | A1* | 5/2015 | Campagna | H04L 9/0866 380/270 |
| 2015/0349960 | A1* | 12/2015 | Bagley | H04L 9/3242 713/168 |
| 2015/0351075 | A1* | 12/2015 | Korver | H04W 52/0209 455/458 |
| 2016/0087957 | A1* | 3/2016 | Shah | H04L 63/205 726/1 |
| 2017/0288872 | A1* | 10/2017 | Lu | H04L 9/32 |

FOREIGN PATENT DOCUMENTS

| | | |
|---|---|---|
| CN | 102801531 A | 11/2012 |
| CN | 103663088 A | 3/2014 |
| CN | 104158664 A | 11/2014 |
| CN | 104301109 A | 1/2015 |
| CN | 204103934 U | 1/2015 |
| CN | 104660416 A | 5/2015 |
| EP | 1 679 578 A1 | 7/2006 |

OTHER PUBLICATIONS

The Chinese First Examination Report of corresponding Chinese application No. 201510077143.7.

* cited by examiner

PUSH AUTHENTICATION WITH VOICE INFORMATION FOR MOBILE TERMINALS

CROSS-REFERENCE TO RELATED APPLICATIONS

This application is a continuation of International Application No. PCT/CN2016/073107, filed on Feb. 1, 2016, which claims priority to Chinese Patent Application No. 201510077143.7, filed on Feb. 13, 2015, entitled "WORKING METHOD OF VOICE AUTHENTICATION SYSTEM AND DEVICE", both of which are hereby incorporated by reference in their entireties.

FIELD OF THE INVENTION

The present invention relates to information security field, more particularly, relates to a working method of a voice authentication system and a device.

BACKGROUND OF THE INVENTION

Mobile terminal token, of which full name is dynamic password mobile device token, is mobile device client side software for generating a dynamic password and the mobile device includes mobile phone, pad, etc. The mobile terminal token is implemented by running a program on the mobile device to generate a dynamic password, the dynamic password is bound to a mobile terminal to implement identity authentication and no communication and fee is generated in the process of generating the dynamic password. With advantages such as simple using, high security, low cost, requiring no extra device, easy obtained and no logistic, the mobile terminal token is trend of dynamic password identity authentication in 3G times.

In authentication process of the prior art, when a message is pushed to the mobile terminal token, the token informs a user through a displaying way, receives an option button triggered by the user, the way of which may have a click error due to a mistaken operation caused by the user; if it happens that an application is logged on by a hacker at that time, irretrievable damage is caused and security level is low; and as user is informed via the displaying way, it may not draw attention from the user and the user will not response to the information in time, thereby leading to delay of authentication.

SUMMARY OF THE INVENTION

In order to solve the problem in the prior art, the present invention provides a working method of a voice authentication system and a device.

A working method of a voice authentication system, which is applied in a system comprising an application interface, an application server, an authentication server and a mobile terminal token, comprises:

step S1, receiving, by the application interface, user information input by a user, sending the user information to the application server;

step S2, after receiving the user information, generating, by the application server, an authentication request according to the user information and an internally stored application name, sending the authentication request to the authentication server;

step S3, after receiving the authentication request, generating, by the authentication server, a challenge value and storing the challenge value, obtaining the user information and the application name from the authentication request;

step S4, generating, by the authentication server, a push authentication request according to the challenge value, the user information and the application name, pushing the push authentication request to a corresponding mobile terminal token via a network data link corresponding to the user information;

step S5, after receiving the push authentication request, generating, by the mobile terminal token, voice information according to the user information and the application name in the push authentication request;

step S6, broadcasting, by the mobile terminal token, the voice information, collecting a voice response of the user;

step S7, after collecting the voice response of the user, analyzing, by the mobile terminal token, the voice response, and determining, according to an analyzing result, whether logon is authorized, if yes, executing step S8; otherwise, ending the procedure;

step S8, obtaining, by the mobile terminal token, a first response value by computing according to the challenge value in the push authentication request and an internally stored token seed key, generating an authorization result comprising the first response value, sending the authorization result to the authentication server via the network data link;

step S9, after receiving the authorization result, obtaining, by the authentication server, the first response value from the authorization result, obtaining a stored server seed key and the challenge value, obtaining a second response value by computing according to the challenge value and the server seed key;

step S10, determining, by the authentication server, whether the first response value and the second response value are matched, if yes, sending an authentication result of successful authentication to the application server, executing step S11; otherwise, ending the procedure;

step S11, after receiving the authentication result of successful authentication, sending, by the application server, successful authentication information to the application interface;

step S12, after receiving the successful authentication information, permitting, by the application interface, the user to access an application, ending the procedure.

A working method of an authentication server in a voice authentication system, comprises:

step T1, after receiving an authentication request from an application server, generating, by the authentication sever, a challenge value and storing the challenge value, obtaining user information and an application identification from the authentication request;

step T2, obtaining, by the authentication server, a corresponding network data link according to the user information and obtaining a corresponding application name according to the application identification;

step T3, generating, by the authentication server, a push authentication request according to the challenge value, the user information and the application name, pushing the push authentication request to a corresponding mobile terminal token via the network data link;

step T4, receiving, by the authentication server, an authorization result returned by the mobile terminal token, obtaining a first response value from the authorization result, obtaining a corresponding stored server seed key and the challenge value, computing according to the challenge value and the server seed key to obtain a second response value;

step T5, determining, by the authentication server, whether the first response value and the second response value are matched, if yes, returning an authentication result of successful authentication to the application server, ending the procedure; otherwise, returning an authentication result of failed authentication to the application server, ending the procedure.

A working method of a mobile terminal token in a voice authentication system, comprises:

step K1, receiving, by the mobile terminal token, a push authentication request from an authentication server;

step K2, obtaining, by the mobile terminal token, user information and an application name from the push authentication request, generating voice information according to the user information and the application name;

step K3, broadcasting, by the mobile terminal token, the voice information, collecting a voice response of a user;

step K4, after collecting the voice response of the user, analyzing, by the mobile terminal token, the voice response, determining, according to an analyzing result, whether logon is authorized, if yes, shutting down recording, executing step K5; otherwise, ending the procedure;

step K5, obtaining, by the mobile terminal token, a first response value by computing according to a challenge value in the push authentication request and an internally stored token seed key, generating an authorization result comprising the first response value, sending the authorization result to the authentication server via a network data link, ending operations of the token.

The advantage of the present invention is that: by the technical solution of the present invention, the mobile terminal token informs the user of authentication information via the way of voice and the voice information that the user is requested to return is generated via the challenge value; in this way, click errors caused by user's mistake can be avoided; it is convenient to remind the user of current information; authentication delay is avoided and security is enhanced.

BRIEF DESCRIPTION OF THE DRAWINGS

The technical solutions of the embodiments of the disclosure are described clearly and completely in conjunction with the accompanying drawings as follows. Apparently, the described drawings are merely a part of but not all of the embodiments according to the disclosure. Based on the described drawings of the disclosure, other drawings can be obtained by those of ordinary skill in the art without any creative work.

DETAILED DESCRIPTION

The objectives, technical solutions and advantages of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure. It should be understood that the terms "include" and/or "comprise", specify the presence of stated features, actions, integers, steps, operations, elements, and/or components, but do not preclude the presence or addition of one or more other features, actions, integers, steps, operations, elements, components, and/or combinations thereof.

In the present invention, a voice authentication system includes an application interface, an application server, an authentication server and a mobile terminal token, a voice authentication device includes an authentication server and a mobile terminal token.

In the present invention, in a process of the authentication server activating the mobile terminal token, a network data link is built between the authentication server and the mobile terminal token, and a corresponding relation between user information and the network data link is stored in the authentication server; afterwards, each time when the mobile terminal token is activated, an access address stored internally is obtained; the authentication server is accessed according to the access address, and the network data link, preferably the network data link of TCP protocol, between the mobile terminal token and the authentication server is rebuilt; the mobile terminal token sends token information to the authentication server via the network data link; after receiving the token information, the authentication server obtains token information stored correspondingly in a server storage area, if the received token information is not identical to the stored token information, the stored token information is updated to be the received token information.

In this case, the token information includes a token sequence number, a token identification code and a mobile terminal operating system.

For example, the access address stored inside the mobile terminal token is api-dfserv.cloudentify.com: 1843.

The token information sent to the authentication server by the mobile terminal token is:

{"tokens":["100000000671000000003"], "os":"1",udid": "579871178279716725688" "reqtype":"1"}.

Embodiment 1

Figure 1A:
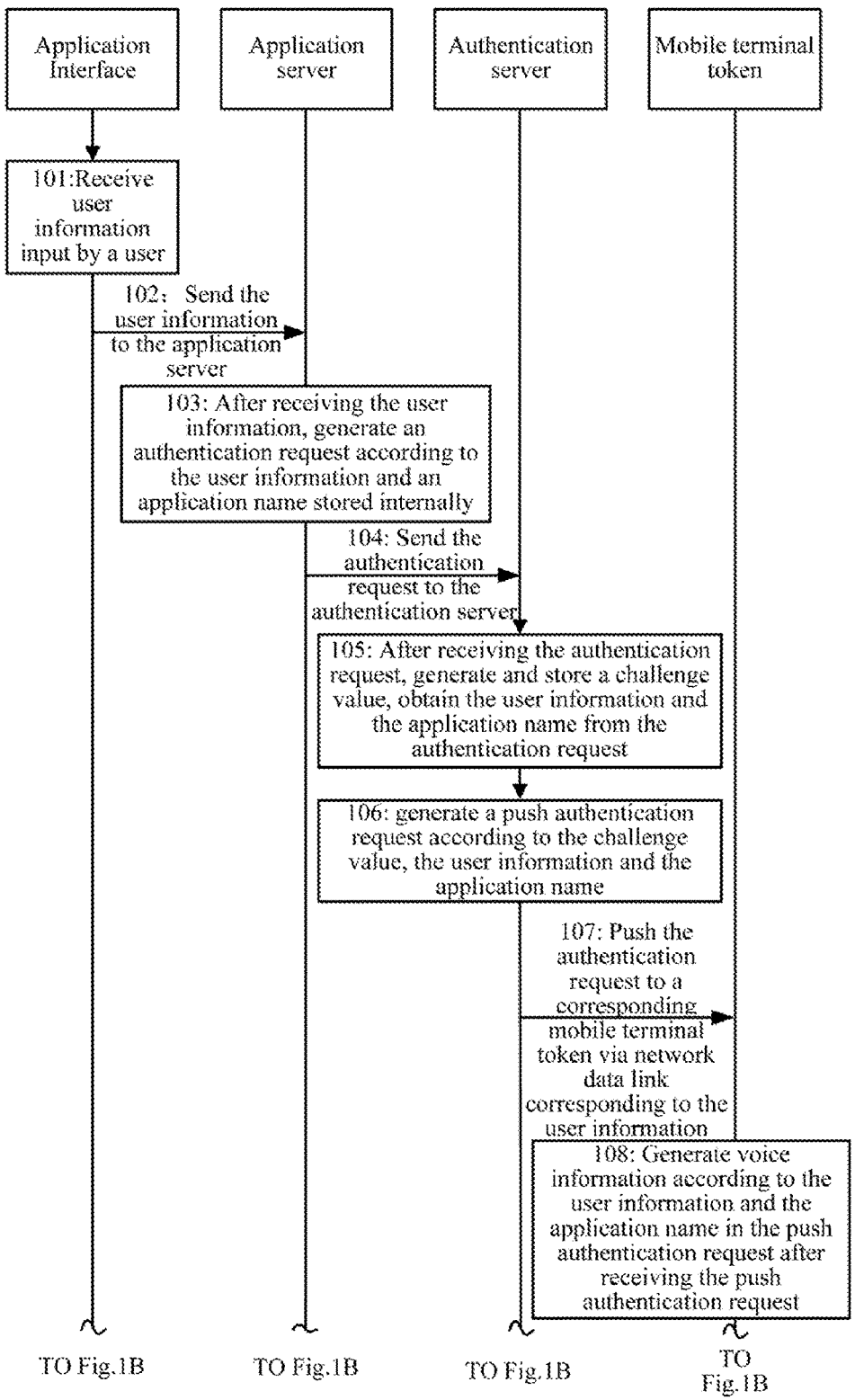
FIG. 1A and FIG. 1B are flow charts of a working method of a voice authentication system provided by Embodiment 1.
Figure 1B:
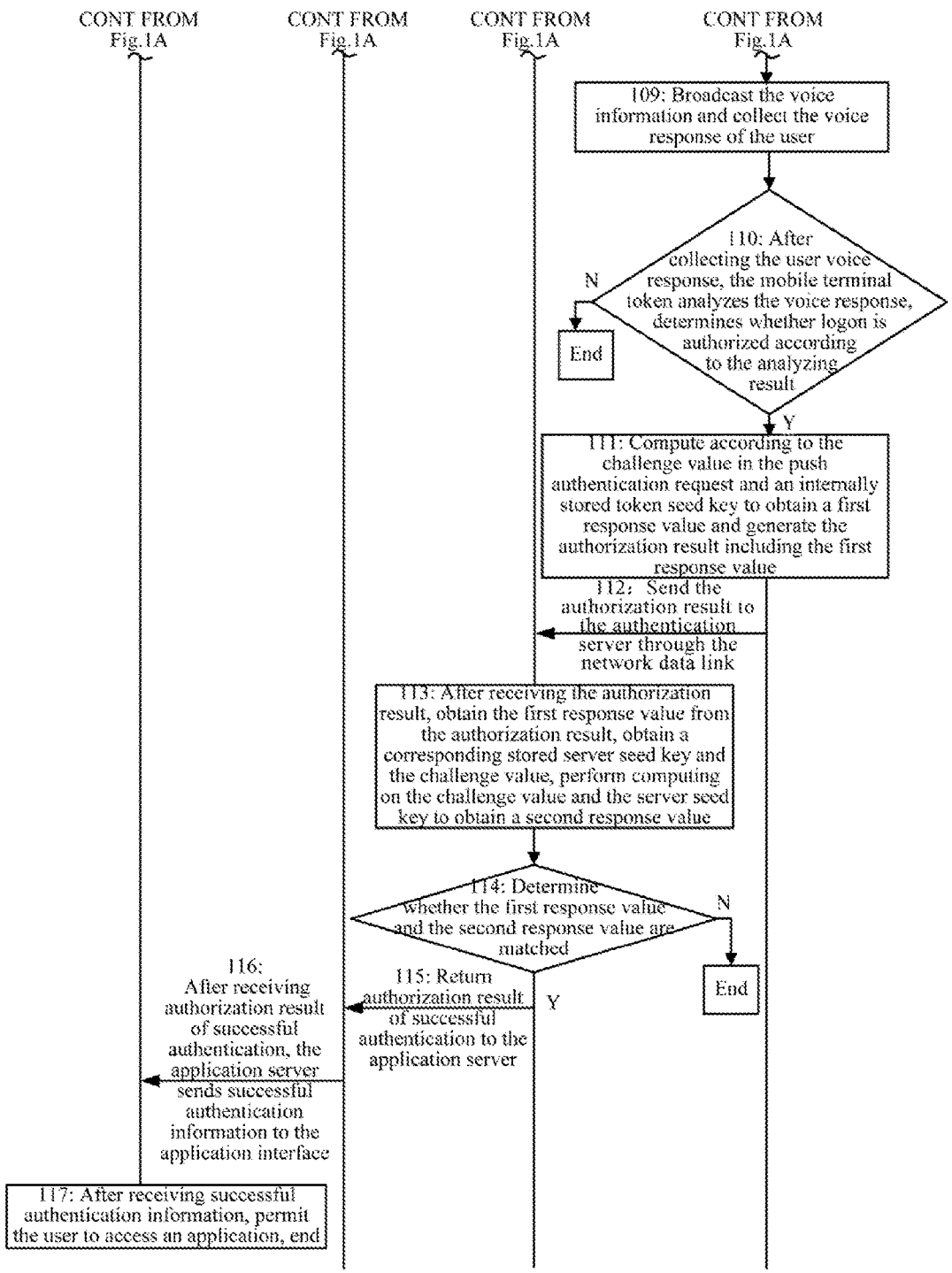
Figure 2:
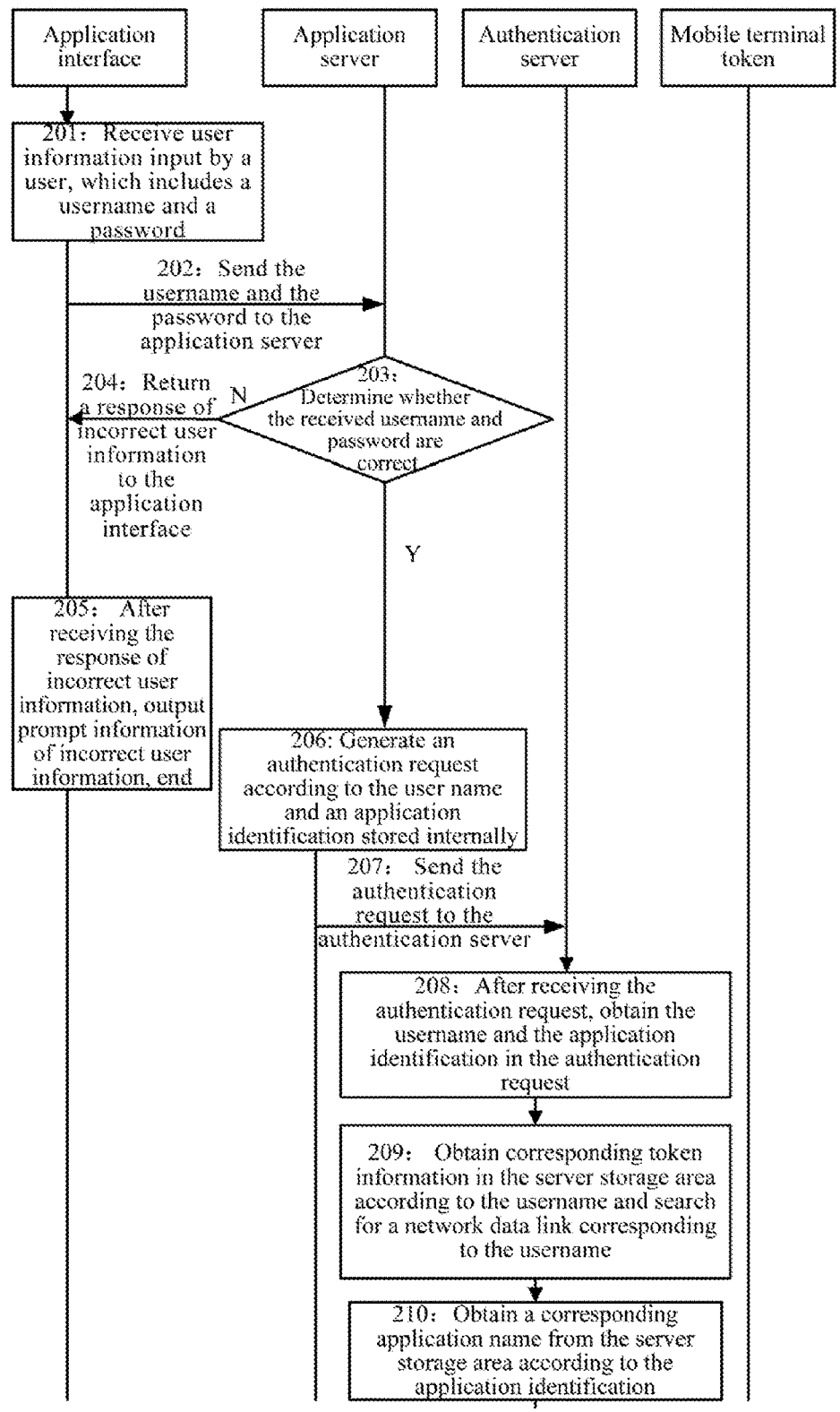
FIG. 2 is a flow chart of a working method of a voice authentication system provided by Embodiment 2.
Figure 3A:
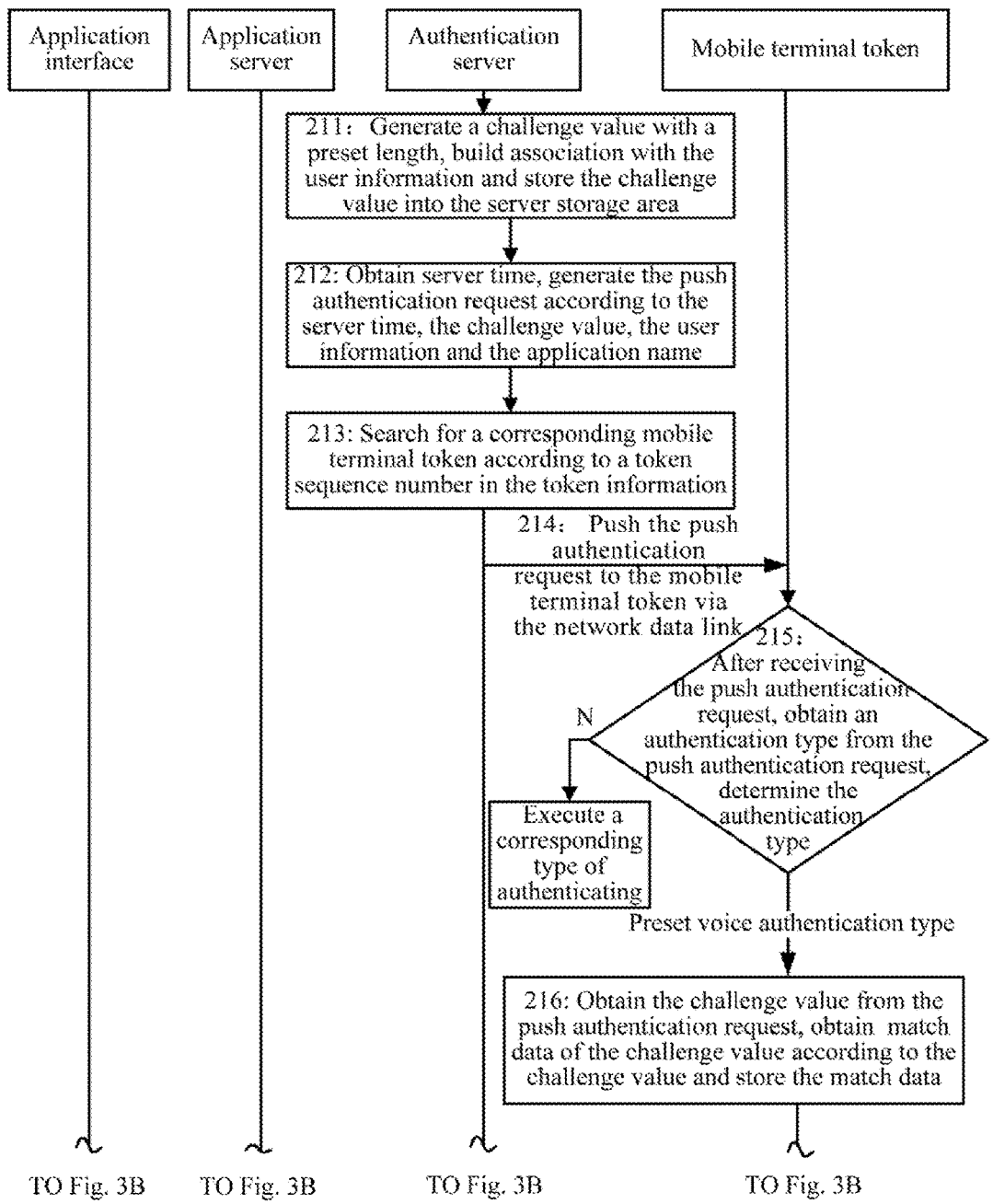
FIG. 3A and FIG. 3B are flow charts of a working method of a voice authentication system provided by Embodiment 2.
Figure 3B:
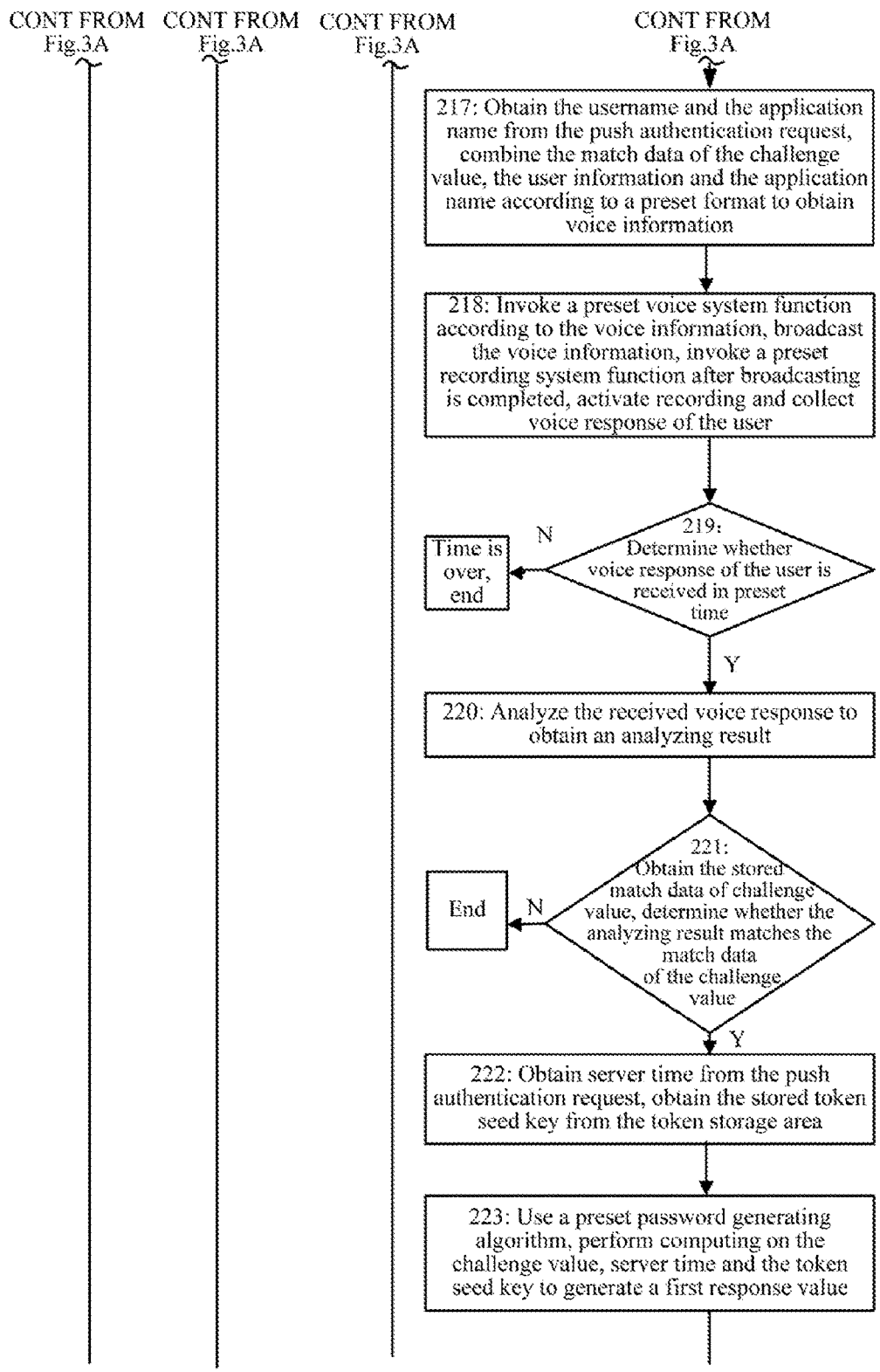
Figure 4A:
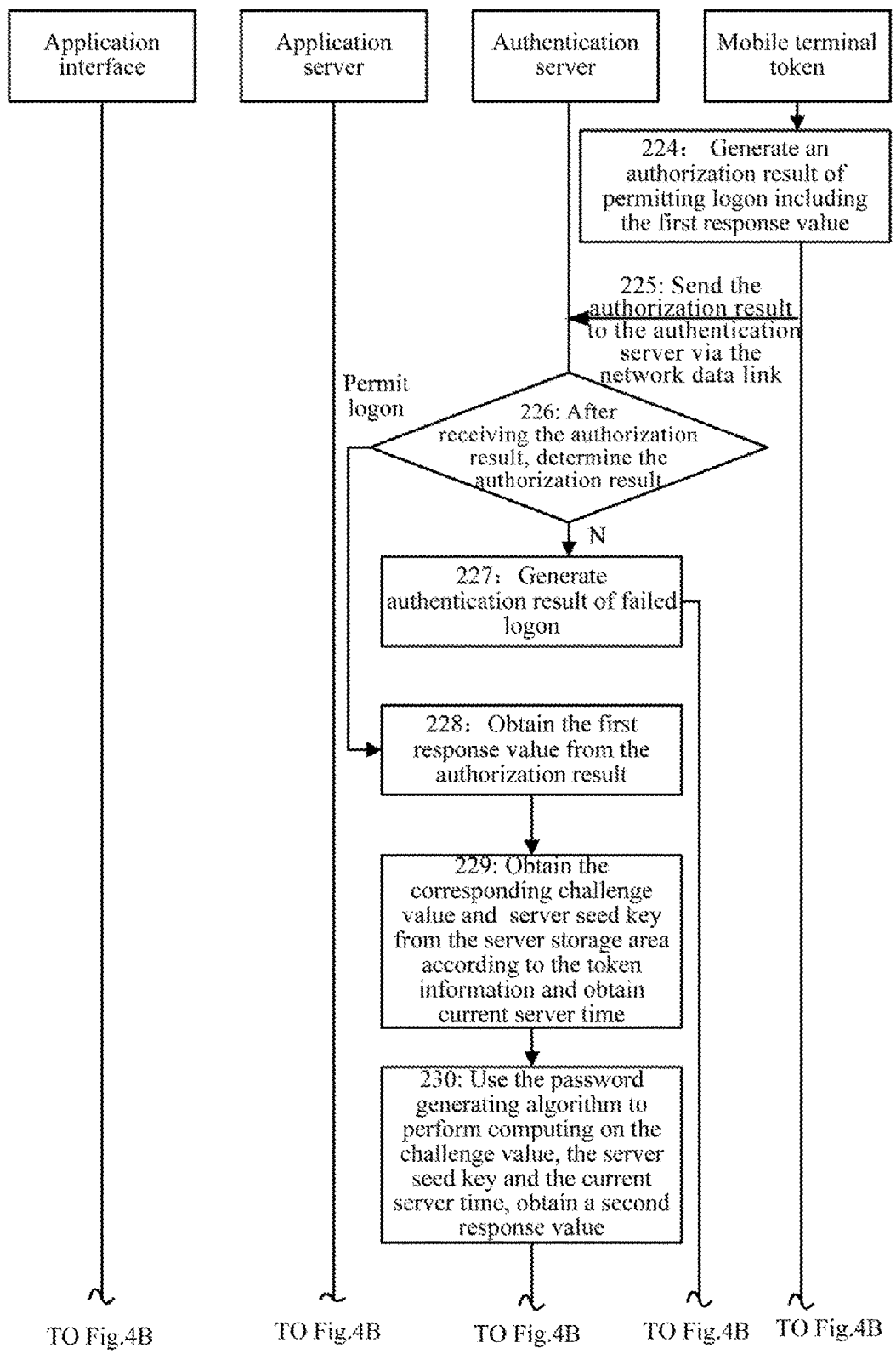
FIG. 4A and FIG. 4B are flow charts of a working method of a voice authentication system provided by Embodiment 2.
Figure 4B:
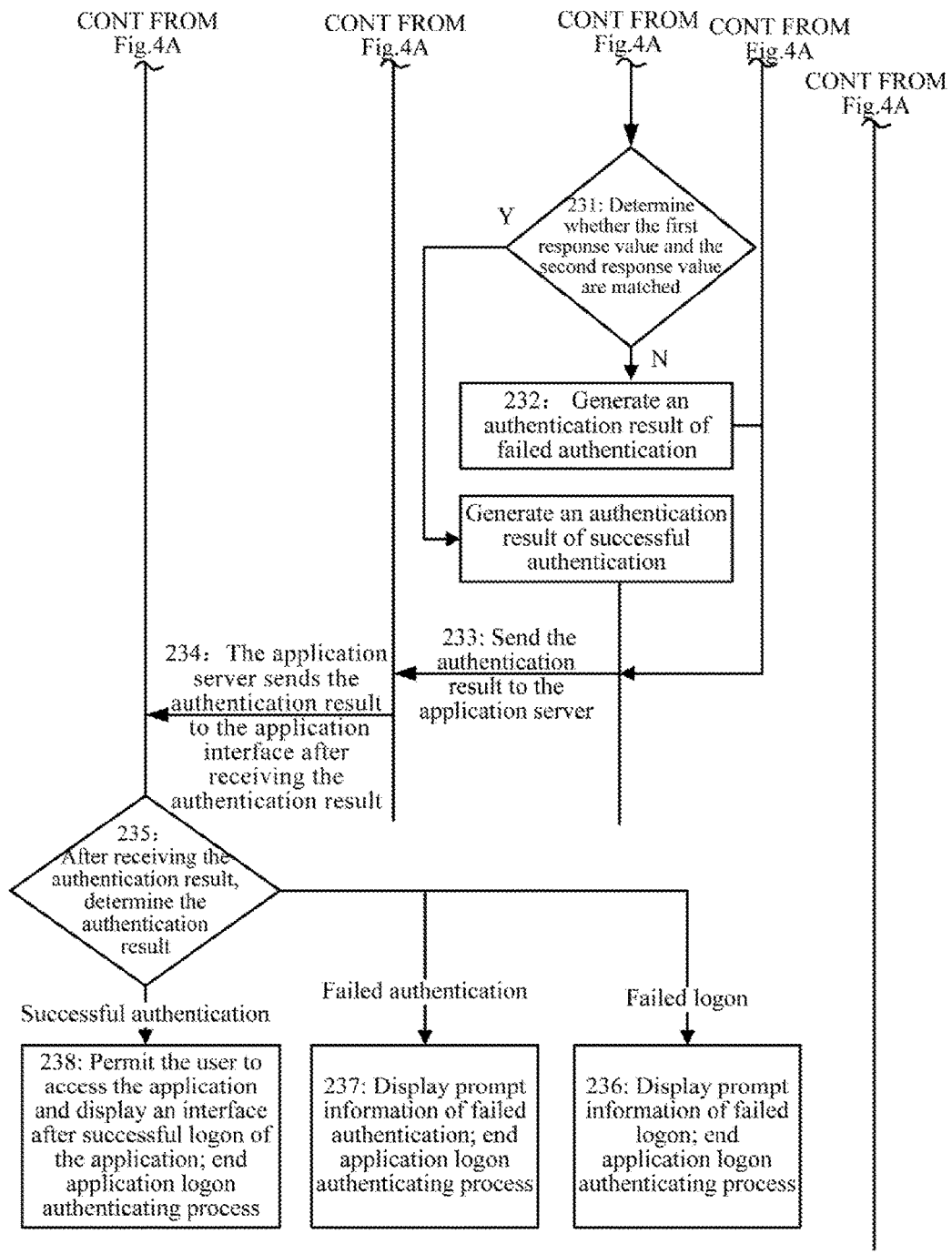

Embodiment 1 of the present invention provides a working method of a voice authentication system, which is applied in a system including an application interface, an application server, an authentication server and a mobile terminal token; as shown by FIG. 1A and FIG. 1B, the method includes:

Step 101, the application interface receives user information input by a user.

In this case, the user information can be a username, or can be a username and a password. This embodiment takes an example in which the user information is a username for illustration.

Step 102, the application interface sends the user information to the application server.

Step 103, after receiving the user information, the application server generates an authentication request according to the user information and an application name stored internally.

Step 104, the application server sends the authentication request to the authentication server.

Step 105, after receiving the authentication request, the authentication server generates a challenge value and stores the challenge value, obtains the user information and the application name from the authentication request.

Step 106, the authentication server generates a push authentication request according to the challenge value, the user information and the application name.

Step 107, the authentication server pushes the push authentication request to a corresponding mobile terminal token via a network data link corresponding to the user information.

Step 108, after receiving the push authentication request, the mobile terminal token generates voice information according to the user information and the application name in the push authentication request.

Step 109, the mobile terminal token broadcasts the voice information and collects a voice response of the user.

After broadcasting the voice information, step 109 further includes activating recording.

Step 110, after receiving the voice response of the user, the mobile terminal token analyzes the voice response, determines, according to an analyzing result, whether logon is authorized, if yes, execute step 111; otherwise, end the procedure.

When the determination result is yes, step 110 further includes shutting down recording.

In the present embodiment, determining, according to the analyzing result, whether logon is authorized specifically includes: determining, by the mobile terminal token, whether the analyzing result is preset authorization logon information, if yes, execute step 108; otherwise, end the procedure.

In this case, the preset authorization logon information can be authorization information such as "OK", "confirm", "YES".

Step 111, the mobile terminal token computes according to the challenge value in the push authentication request and an internally stored token seed key, obtains a first response value and generates an authorization result including the first response value.

Step 112, the mobile terminal token sends the authorization result to the authentication server through the network data link.

Step 113, after receiving the authorization result, the authentication server obtains the first response value from the authorization result, obtains a corresponding stored server seed key and a stored challenge value to obtain a second response value.

Step 114, the authentication server determines whether the first response value and the second response value are matched, if yes, execute step 115; otherwise, end the procedure.

Step 115, the authentication server returns an authentication result of successful authentication to the application server.

Step 116, after receiving the authentication result of successful authentication, the application server sends successful authentication information to the application interface.

Step 117, after receiving the successful authentication information, the application interface permits the user to access an application, end the procedure.

Embodiment 2

Embodiment 2 of the present invention provides a method for voice authentication, which is applied in a system including an application interface, an application server, an authentication server and a mobile terminal token; as shown by FIG. 2, FIG. 3A, FIG. 3B, FIG. 4A and FIG. 4B, the method includes:

Step 201, the application interface receives user information input by a user, which includes a username and a password.

In this case, the user information can be a username, or can be a username and a password; the user information being the username and the password is taken as an example for illustration in this embodiment.

For example, the user information includes: the username abc@test.com, the password 168408afag.

Step 202, the application interface sends the username and the password to the application server.

Step 203, the application server determines whether the received username and password are correct, if yes, execute step 206; otherwise, execute step 204.

Specifically, the application server determines whether user information corresponding to the received username can be obtained from a server storage area, if the user information can be obtained, determines whether a password in the user information in the server storage area is identical to the received password, if yes, the username and the password are correct; otherwise, the username and password are not correct, execute step 204; if the user information cannot be obtained, return a response indicating that the username is not correct to the application interface.

Step 204, the application server sends a response indicating that the user information is not correct to the application interface.

Step 205, after receiving the response indicating that the user information is not correct, the application interface outputs prompt information of incorrect user information, end the procedure.

In the present embodiment, before step 205, the method further includes: initializing authenticating times; when receiving the response indicating that the user information is not correct, step 205 further includes: updating the authenticating times, determining whether the updated authenticating times reaches preset times, if yes, report an error, end the procedure, otherwise, go back to step 201; in this case, the initial value of authenticating times is 0, the preferred updating of authenticating times is adding 1 to the authenticating times, the preferred preset times are 3.

Further, in the present embodiment, after the application interface outputs the prompt information indicating that the user information is not correct, the method further includes: outputting prompt information of re-entering the user information, waiting for the user to input the user information, and going back to step 201.

Step 206, the application server generates an authentication request according to the username and an application identification stored internally.

Step 206 further includes that: the application server uses a first preset agreement key to encrypt the authentication request, obtains cipher text of the authentication request.

In this case, encrypting the authentication request with the first preset agreement key specifically includes that: the application server uses the first preset agreement key to encrypt the authentication request according to a preset encryption algorithm; preferably, the preset encryption algorithm is DES algorithm; in addition, the preset encryption algorithm can be RSA algorithm, etc.

For example, the application interface is WEB SDK logon interface, the corresponding application identification is yiwnzh-ajg.

Step 207, the application server sends the authentication request to the authentication server.

Step 207 specifically includes that: the application server sends the authentication request to an authentication proxy, the authentication proxy forwards the authentication request to the authentication server after receiving the authentication request.

Step 207 can also include that: the application server sends the cipher text of the authentication request to the authentication proxy; after receiving the cipher text of the authentication request, the authentication proxy sends the cipher text of the authentication request to the authentication server.

Step 208, after receiving the authentication request, the authentication server obtains the username and the application identification in the authentication request.

Step 208 can also include that, after receiving the cipher text of the authentication request, the authentication server decrypts the cipher text of the authentication request according to the first preset agreement key, obtains the authentication request and obtains the username and the application identification in the authentication request.

In this case, decrypting the cipher text of the authentication request according to the first preset agreement key specifically includes that: the authentication server uses the first preset agreement key to decrypt the cipher text of the authentication request according to the preset decrypting algorithm; preferably, the preset decrypting algorithm is DES algorithm; in addition, the preset decrypting algorithm can be RSA algorithm, etc.

Step 209, the authentication server obtains corresponding token information in the server storage area according to the username and searches for the network data link corresponding to the username.

In the present embodiment, after the authentication server obtains the username from the authentication request, the method further includes: determining whether a user record corresponding to the username can be found in the server storage area, if yes, continuing the procedure, otherwise, returning information indicating that the user is not registered to the application server.

In the present embodiment, the user record stored in the server storage area includes: the username, the server seed key, the application name and the token information; in this case, the token information includes a token identification code, a token sequence number, a mobile terminal operating system.

Step 210, the authentication server obtains a corresponding application name from the server storage area according to the application identification.

Step 210 further includes: determining whether the application name corresponding to the application identification can be found in the server storage area, if yes, continuing the procedure, otherwise, returning information indicating that the application is not registered to the application server.

Step 211, the authentication server generates a challenge value with a preset length, builds association with the user information and stores the challenge value into the server storage area.

Preferably, the preset length is decimal data with 6 bits.

In the present embodiment, generating the challenge value can be: generating a random number by invoking a random number generating function, taking the random number as the challenge value; or generating the challenge value can also be: obtaining a corresponding server seed key from the server storage area according to the username, computing according to the server seed key to generate the challenge value.

In this case, computing according to the server seed key and generating the challenge value specifically includes: computing according to the server seed key using a preset algorithm to generate the decimal challenge value with length of 6 bits; preferably, the preset algorithm is SM3 algorithm, or the preset algorithm can be OATH algorithm, etc.

For example, the generated challenge value is 308962.

In the present embodiment, there is no special order for step 209, step 210, and step 211 which can be executed at the same time as well.

Step 212, the authentication server obtains server time, generates the push authentication request according to the server time, the challenge value, the user information and the application name.

In this case, generating the push authentication request according to the server time, the challenge value, the user information and the application name specifically includes generating the push authentication request according to the server time, the challenge value, the token information, the user information and the application name.

Step 212 also can be that: the authentication server obtains a token identification code from the server storage area, encrypts the challenge value with the token identification code, obtains cipher text of the challenge value, and generates the push authentication request according to the server time, the cipher text of the challenge value, the user information and the application name.

The present step can also include that the authentication server uses a second preset agreement key to encrypt the push authentication request and obtains the cipher text of the push authentication request.

In this case, using the second preset agreement key to encrypt the push authentication request specifically includes: using the second preset agreement key to encrypt the push authentication request according to a preset encryption algorithm; preferably, the preset encrypting algorithm is DES algorithm, in addition, the preset encryption algorithm can be RSA algorithm, etc.

Before step 212, the method further includes that: the authentication server invokes a random number generating function to generate a first random number and takes the first random number as an authentication request ID, builds association with the username and stores the authentication request ID in the server storage area.

Further, the step further includes that: the authentication server obtains current server time, stores the current server time in the server storage area as generating time of the authentication request ID.

For example, the authentication request ID generated by the authentication server is:
02c0e8b4-be19-49f6-aab6-273b38522cea;
the generating time of the authentication request ID is 1419325026.

Generating the push authentication request according to the server time, the challenge value, the user information and the application name specifically includes generating the push authentication request according to the server time, the challenge value, the user information, the application name and the authentication request ID.

For example, the generated push authentication request is:
{"appname":"WEB SDK","challenge":"308962", "pushtype":"2","reqid":"02c0e8b 4-be19-49f6-aab6-273b38522cea","time":"1419325027","token": "1000000003","userid":"abc@test.com"}; in this case, when pushtype is 2, the authentication type is a preset voice authentication type.

The cipher text of the push authentication request obtained after encrypting is:
{"data":"a539f8d217b3c05cb5a5340c7b8c8842bcfcace 3180c6da9f595015a087c1612 e39110fc2e75debc3e435 e974a2d7907fa50df880b26ce9ecf1ed4988c9b1c5ad3d00d4 942efcd06f83df5624b35769c00f770fd2bb4ada37e0b9c1ac 74513ef1e83fc519cb88a66651a875e7423 ed4ff7aa546c07bc96251683d617ec8cf03f007f3287352646 ee92edcfd08dced63cd916018ea7596a3b2ccd44f958a6e224 5a6dc863230d1940333430703a798eef","mac": "3531e1c344107efd 1bee06dac2c15f9f71467a3f"}.

Step 213, the authentication server searches for a corresponding mobile terminal token according to the token sequence number in the token information.

Specifically, the authentication server obtains a corresponding token sequence number according to the username, obtains a corresponding network data link according to the token sequence number and searches for a corresponding mobile terminal token according to the network data link.

Step 214, the authentication server pushes the push authentication request to the mobile terminal token via the network data link.

Step 214 further can be that the authentication server pushes the cipher text of the push authentication request to the mobile terminal token by the network data link.

Step 215, after receiving the push authentication request, the mobile terminal token obtains an authentication type from the push authentication request, determines the authentication type, if the authentication type is the preset voice authentication type, execute step 216; otherwise, execute a corresponding type of authentication.

Before step 215, the method further includes that, after receiving the cipher text of the push authentication request, the mobile terminal token decrypts the cipher text of the push authentication request by using a second preset agreement key, obtains the push authentication request.

Specifically, decrypting the cipher text of the push authentication request by using the second preset agreement key specifically includes that: the authentication server uses a preset decrypting algorithm to decrypt the cipher text of the push authentication request according to the second preset agreement key; preferably, the preset decrypting algorithm is DES algorithm; in addition, the preset decrypting algorithm is DES algorithm, etc.

Preferably, the mobile terminal token determines whether the authentication type is 2, if yes, the authentication type is the preset voice authentication type, otherwise, the authentication type is not the preset voice authentication type.

Further, it should be noted that authenticating of a non-preset voice authentication type is not in the scope limited by the present invention.

Step 216, the mobile terminal token obtains the challenge value from the push authentication request, obtains match data of the challenge value according to the challenge value and stores the match data of the challenge value.

In the present embodiment, obtaining the challenge value from the push authentication request can also include that: the mobile terminal token obtains cipher text of the challenge value from the push authentication request, obtains the token identification code from the mobile terminal token, decrypts the cipher text of the challenge value by using the token identification code, obtains the challenge value.

In step 216, obtaining the match data of the challenge value according to the challenge value specifically includes following cases:

1. The data at a preset digit in the challenge value is taken as first match data, i.e. the match data of the challenge value.

For example, the challenge value is 308962, the data on the second, the fourth and the sixth digits of the challenge value, i.e. 092, is taken as the first match data, i.e. the match data of the challenge value.

2. Preset computing is performed on the challenge value to generate a second match data, i.e. the match data of the challenge value.

For example, the challenge value is 308962, computing is performed on the challenge value to generate the second match data 621, i.e. the match data of the challenge value.

3. the challenge data is taken as the match data of the challenge value.

For example, the challenge value 308962 is taken as the match data of the challenge value.

Step 217, the mobile terminal token obtains the username and the application name from the push authentication request, combines the match data of the challenge value, the user information and the application name according to a preset format to obtain voice information.

In the present embodiment, the preset format is: Dear XXX (username), your account logs on XXX (application name) at XXX (the current time of the token), please confirm the logon by responding XXX (match data of the challenge value) in voice; refuse logon by responding NO in voice.

Step 218, the mobile terminal token invokes a preset voice system function according to the voice information, broadcasts the voice information, invokes a preset recording system function after broadcasting is completed, activates recording and collects a voice response of the user.

In the present embodiment, activating recording specifically includes that: the mobile terminal token allocates a recording storage area, invokes a recording function in the operating system, transfers the initial address of the recording storage area into the recording function, activates recording, receives recording data according to a preset sampling frequency, a preset sampling size and a preset sound channel.

For example, in Windows operating system, by constructing WAVEFORMATEX structure, sampling frequency transferred in is 44100, sampling size is 16 bits and the sound channel is single track; waveInOpen function is invoked, WAVEFORMATEX structure is transferred in, HWAVEIN handle is obtained, WAVEHDR structure is constructed, recording buffer address is transferred in, waveInPrepareHeader function is invoked, WAVEHDR structure is transferred in to prepare for recording, waveInAddBuffer function is invoked, the WAVEHDR structure is transferred in to inform the recording buffer address to the recording device, waveInStart function is invoked, WAVEIN handle is transferred in to start recording.

In Android operating system, by constructing AudioRecord object and with sampling frequency transferred in of 44100, sampling size of 16 bits, and sound channel of single track, the read method of AudioTrack class is invoked to start recording.

In the iOS operating system, by creating QueueState object and with sampling frequency transferred in of 44100, sampling size of 16 bits, and the sound channel of single track, AudioQueueNewlnput function is invoked, QueueState object is transferred in, AudioQueueAllocateBuffer function is invoked, the recording storage area is allocated, AudioQueueEnqueueBuffer function is invoked, buffer is added to the recording queue, AudioQueueStart is invoked to start recording.

In Windows Phone 7 operating system, by creating Microphone object and with sampling frequency transferred in of 44100, sampling size of 16 bits and the sound channel of single track, Start method of Microphone class is invoked to start recording.

Step 219, the mobile terminal token determines whether the voice response of the user is received in preset time, if yes, execute step 220; otherwise, time is over, end the procedure.

Preferably, the preset time is 30 s.

In step 219, further, when the mobile terminal token does not receive the voice response of the user in preset time, the mobile terminal token outputs prompt information of overtime, returns an authorization result of overtime to the authentication server; after receiving the authorization result of overtime, the authentication server sends an authentication result of overtime to the application interface, the application interface outputs prompt information of overtime; end the procedure.

Step 220, the mobile terminal token analyzes the received voice response to obtain an analyzing result.

In the present embodiment, analyzing the recording data in the data storage area to obtain the analyzing result specifically includes: obtaining the analyzing result after performing wave filtering operation, blocking operation, low-pass filtering operation and converting operation.

Step 221, the mobile terminal token obtains the stored match data of the challenge value, determines whether the analyzing result matches the match data of the challenge value, if yes, execute step 222; otherwise, end the procedure.

In the present embodiment, corresponding to step 216, obtaining the stored match data of the challenge value and determining whether the analyzing result matches the match data of the challenge value specifically includes following cases:

1. obtaining stored first match data, determining whether the analyzing result matches the first match data, if yes, the analyzing result matches the match data of the challenge value, authorizing logon; otherwise, the analyzing result does not match the match data of the challenge value;

2. obtaining stored second match data, determining whether the analyzing result matches the second match data, if yes, the analyzing result matches the match data of the challenge value, authorizing logon, otherwise, the analyzing result does not match the match data of the challenge value;

3. obtaining a stored challenge value, determining whether the analyzing result matches the challenge value, if yes, the analyzing result matches the match data of the challenge value, authorizing logon; otherwise, the analyzing result does not match the match data of the challenge value.

In the present step, when the mobile terminal token determines that the analyzing result is not identical to the match data of the challenge value, the mobile terminal token outputs prompt information of incorrect voice response and returns an authorization result of voice response error to the authentication server; after the authentication server receives the authorization result of voice response error, the authentication server returns failed authentication result to the application server; after the application server receives the failed authentication result, the application server returns the failed authentication result to the application interface; the application interface outputs prompt information of failed authentication, the procedure is ended.

Figure 5:
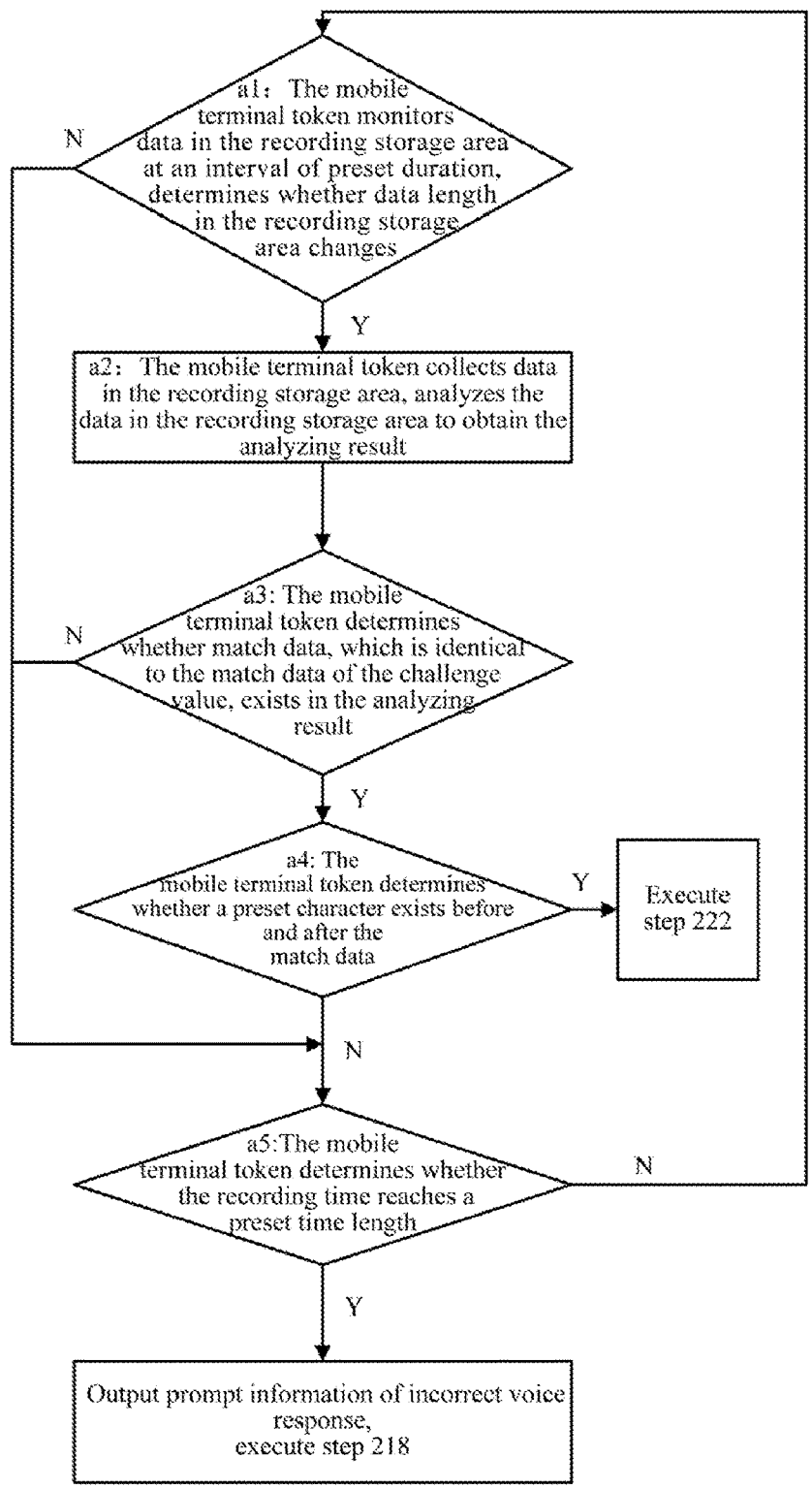
FIG. 5 is a detailed flow chart of steps from 219 to 221 in Embodiment 2 of the present invention.

Referring to FIG. 5, in the present embodiment, steps 219 to 221 specifically include:

Step a1, the mobile terminal token monitors data in the recording storage area at an interval of preset duration, determines whether the data length in the recording storage area changes, if yes, execute step a2; otherwise, execute step a5.

Step a1 can further include: monitoring the data length in the recording storage area at an interval of preset duration, if the length has no change, updating collecting failure times, going back to step 218; when the collecting failure times reaches preset times, preferably, 2 times, shutting down recording, ending the procedure.

Step a2, the mobile terminal token collects data in the recording storage area, analyzes the data in the recording storage area to obtain the analyzing result.

For example, the obtained analyzing result is 123 092 2540.

Step a3, the mobile terminal token determines whether match data, which is identical to the match data of the challenge value, exists in the analyzing result, if yes, execute step a4; otherwise, execute step a5.

For example, match data 092, which is identical to the match data of the challenge value, exists in the analyzing result.

Step a4, the mobile terminal token determines whether a preset character exists before and after the match data, if yes, execute step 222; otherwise, execute step a5.

Preferably, the preset character is space.

For example, space exists before and after the match data 092 in the analyzing result.

Step a5, the mobile terminal token determines whether the recording time reaches a preset time length, if yes, outputs prompt information of incorrect voice response, execute step 218; otherwise, go back to step a1.

Preferably, the preset time length is 30 s; if the recording time reaches a preset time length, step a5 further includes broadcasting the voice information repeatedly, i.e. going back to step 218.

Further, after the mobile terminal token outputs the prompt information of incorrect voice response, the method can further include:

obtaining error times of the voice response, determining whether the error times reaches a preset value, if yes, returning authorization information of voice response error to the authentication server, otherwise, updating the error times, going back to execute step 218; correspondingly, before step 218, the method further includes: initializing the error times of the voice response to be 0.

For example, the analyzing result obtained by the mobile terminal token is 092, which is identical to the stored match data of the challenge value, i.e. the received voice response of the user is correct.

Further, the voice information organized by the mobile terminal token includes broadcasting "please response 'broadcast repeatedly' in voice if required"; when the analyzing result obtained by analyzing the received voice response is "broadcast repeatedly", go back to step 218.

Step 222, the mobile terminal token obtains server time from the push authentication request, obtains the stored token seed key from the token storage area.

Step 223, the mobile terminal token uses a preset password generating algorithm, performs computing on the challenge value, server time and the token seed key to generate a first response value.

Preferably, in the present embodiment, the mobile terminal token generates a first response value with preset length, the preset length preferably is decimal data with 6 bits.

Specifically, the mobile terminal token uses the preset password generating password to perform computing on the challenge value, the server time, the token seed key and a dynamic factor to generate the first response value.

For example, the first response value generated by the mobile terminal token is 677165.

Step 224, the mobile terminal token generates the authorization result of permitting logon including the first response value; execute step 225.

Step 224 further includes that the mobile terminal token encrypts the authorization result by using a second preset agreement key to obtain cipher text of the authorization result.

Specifically, generating the authorization result of permitting logon which includes the first response value specifically includes: generating the authorization result of permitting logon according to the first response value, token information and authentication request ID.

For example, the authorization result of permitting logon generated by the mobile terminal token is:
{"result":"1","time":"1419325027","reqtype":"2","otp":"677165","token":"10000 00003","reqid":"02c0e8b4-be19-49f6-aab6-273b38522cea"}.

The cipher text of the authorization result obtained by encrypting is:
{"data":"4fbd9ef79abbb78b5967b4364b93db26527dc3a4c0b5dcadd34428de3649fc0f4e07a7f4282b5b88c21500f1b4c8bed324ec80f3815264787ea90a4723e024fb3a4e6cb09b7b44f801c9cc64cd50334fc8f037206d706dfc40727d08a3f67d91174db8396b7574fa1fbc09da25d861d9b945f3c7dc9654455ef0e168eb826f8b8e56a928e274f033079bdfb336848b78","app_version":"2.6","mac":"ba7ab1a123c930ca73ad5944d4fd0cf8ee4f0667"}.

In the present embodiment, if the dynamic factor in step 223 includes an event type dynamic factor; after completing of executing step 224, the mobile terminal token updates the event type dynamic factor; preferably, 1 is added to the event type dynamic factor and an initial value of the event type dynamic factor is 0.

Step 225, the mobile terminal token sends the authorization result to the authentication server via the network data link.

Step 225 can further include that the mobile terminal token sends the cipher text of the authorization result to the authentication server via the network data link.

Step 226, after receiving the authorization result, the authentication server determines the authorization result, if the authorization result is permitting logon, execute step 228; otherwise, execute step 227.

In the present embodiment, if a return result of determining the authorization result is 1, logon is permitted; if the return result of determining the authorization result is 0, logon is canceled.

Before step 226, the method further includes that, after receiving the cipher text of the authorization result, the authentication server uses the second preset agreement key to decrypt the cipher text of the authorization result to obtain the authorization result.

Specifically, before step 226, the method further includes that the authentication server obtains an authentication request ID from the authorization result, determines whether the authentication request ID is correct and valid; if yes, execute step 226; otherwise, delete the authentication request ID stored in the server storage area, return a failure response to the application server; end the procedure.

In this case, determining whether the authentication request ID is correct and valid specifically includes that: the authentication server obtains current server time, obtains the stored authentication request ID and generating time of the authentication request ID from the server storage area, determines whether the authentication request ID in the authorization result is identical to the authentication request ID stored in the server storage area, if yes, the authentication request ID is correct, otherwise, the authentication request ID is not correct; determines whether the difference between the current server time and the generating time of the authentication request ID is in a preset time length, if yes, the authentication request ID is valid, otherwise, the authentication request ID is invalid; preferably, when the authentication request ID is incorrect or invalid, the method further includes deleting the stored authentication request ID and the generating time of the authentication request ID in the server storage area.

Step 227, the authentication server generates an authentication result of failed logon, executes step 233.

Step 227 further includes that: the authentication server uses the first preset agreement key to encrypt the authentication result, obtains the cipher text of the authentication result.

Step 228, the authentication server obtains the first response value from the authorization result.

Step 228 specifically includes that the authentication server obtains the first response value and the token information from the authorization result.

For example, the authentication server obtains a token sequence number of 1000000003 and a first response value of 677165 from the authorization result.

Step 229, the authentication server obtains a corresponding challenge value and the server seed key from the server storage area according to the token information and obtains the current server time.

For example, the current server time obtained by the authentication server is 1419325029.

Step 230, the authentication server uses a password generating algorithm to perform computing on the challenge value, the server seed key and the current server time, obtains a second response value.

Specifically, the authentication server uses the password generating algorithm to perform computing on the challenge value, the server seed key, the current server time and a dynamic factor, obtains a second response value.

For example, the second response value generated by the authentication server is 677165.

Step 231, the authentication server determines whether the first response value and the second response value are matched, if yes, generates an authentication result of successful authentication and executes step 233; otherwise, executes step 232.

Step 232, the authentication server generates an authentication result of failed authentication, executes step 233.

Step 232 can further include that the authentication server uses the first preset agreement key to encrypt the authentication result and obtains cipher text of the authentication result.

In the present embodiment, if the dynamic factor in step 230 includes an event type dynamic factor, the authentication server updates the event type dynamic factor after completing step 232; preferably, 1 is added to the event type dynamic factor and the initial value of the event type dynamic factor is 0.

Step 233, the authentication server sends the authentication result to the application server.

Step 233 can further include that the authentication server sends the cipher text of authentication result to the application server.

Step 233 specifically includes that the authentication server sends the authentication result to an authentication proxy; after receiving the authentication result, the authentication proxy sends the authentication result to the application server.

Step 234, the application server sends the authentication result to the application interface after receiving the authentication result.

Step 234 can further include that the application server sending the cipher text of the authentication result to the application interface.

Step 235, after receiving the authentication result, the application interface determines the authentication result, if logon is failed, executes step 236; if the authentication is failed, execute step 237; if the authentication is successful, executes step 238.

Step 235 can further include that, after receiving the cipher text of the authentication result, the application interface uses the first preset agreement key to decrypt the cipher text of the authentication result, obtains the authentication result.

Step 236, the application interface displays prompt information of failed logon; the application logon authenticating process is ended.

Step 237, the application interface displays prompt information of failed authentication; the application logon authenticating process is ended.

Step 238, the application interface permits the user to access the application and displays an interface after the successful logon of the application, the application logon authenticating process is ended.

In this case, when the application logon authenticating process is ended and logon is successful, the client side can perform corresponding operation according to an operation request input by the user to complete accessing the application by the user till the user logs off; it should be noted that the operation after the ending of application logon authentication progress is not in the scope limited by the present invention.

In the present embodiment, step 201 further includes that: the client side activates an overtime timer, detects in real time whether the value of the overtime timer reaches a preset time length, if yes, prompt information of overtime authenticating is prompted, the application logon authenticating process is ended.

Figure 6A:
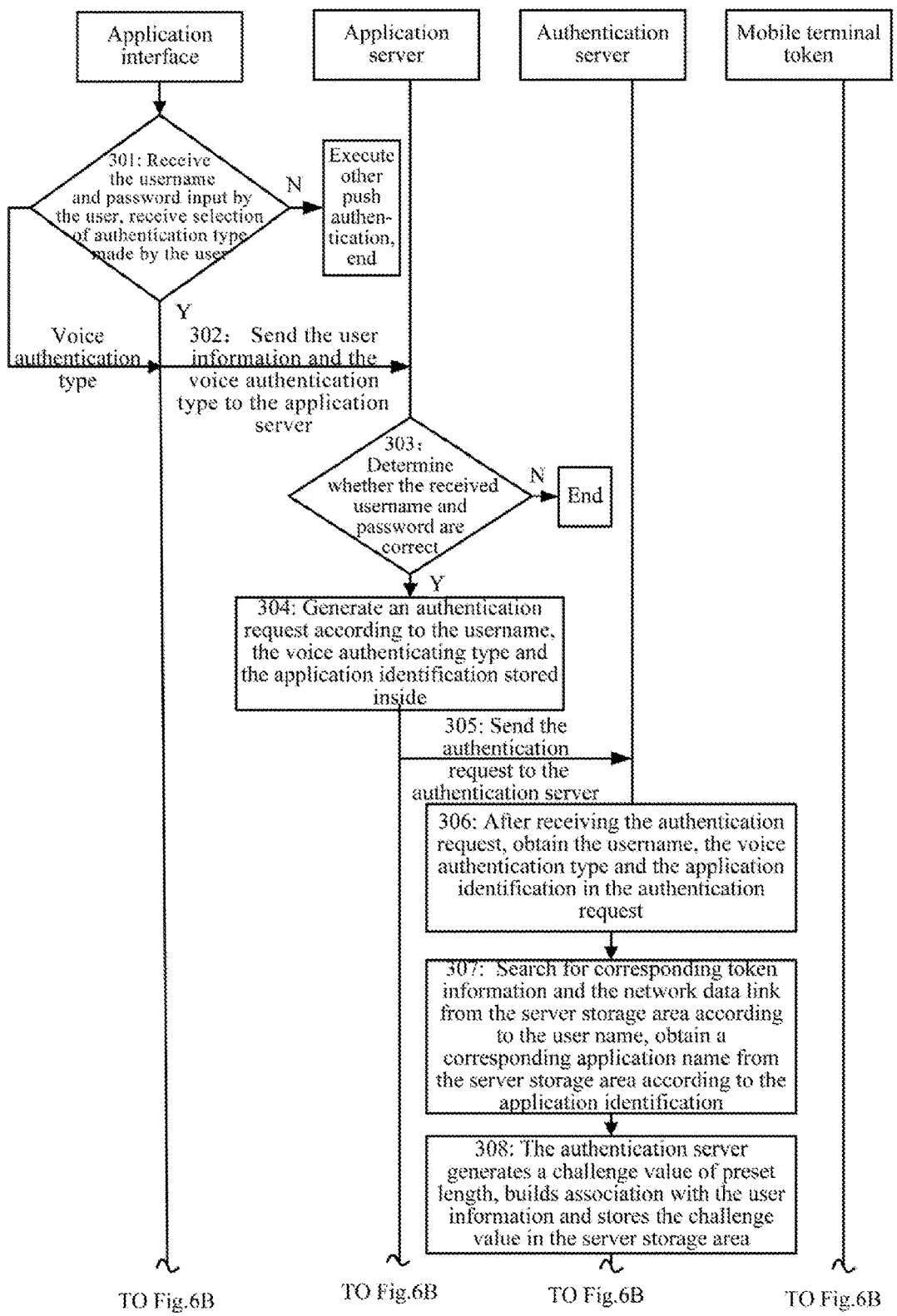
FIG. 6A and FIG. 6B are flow charts of a working method of a voice authentication system provided by Embodiment 2 of the present invention.
Figure 6B:
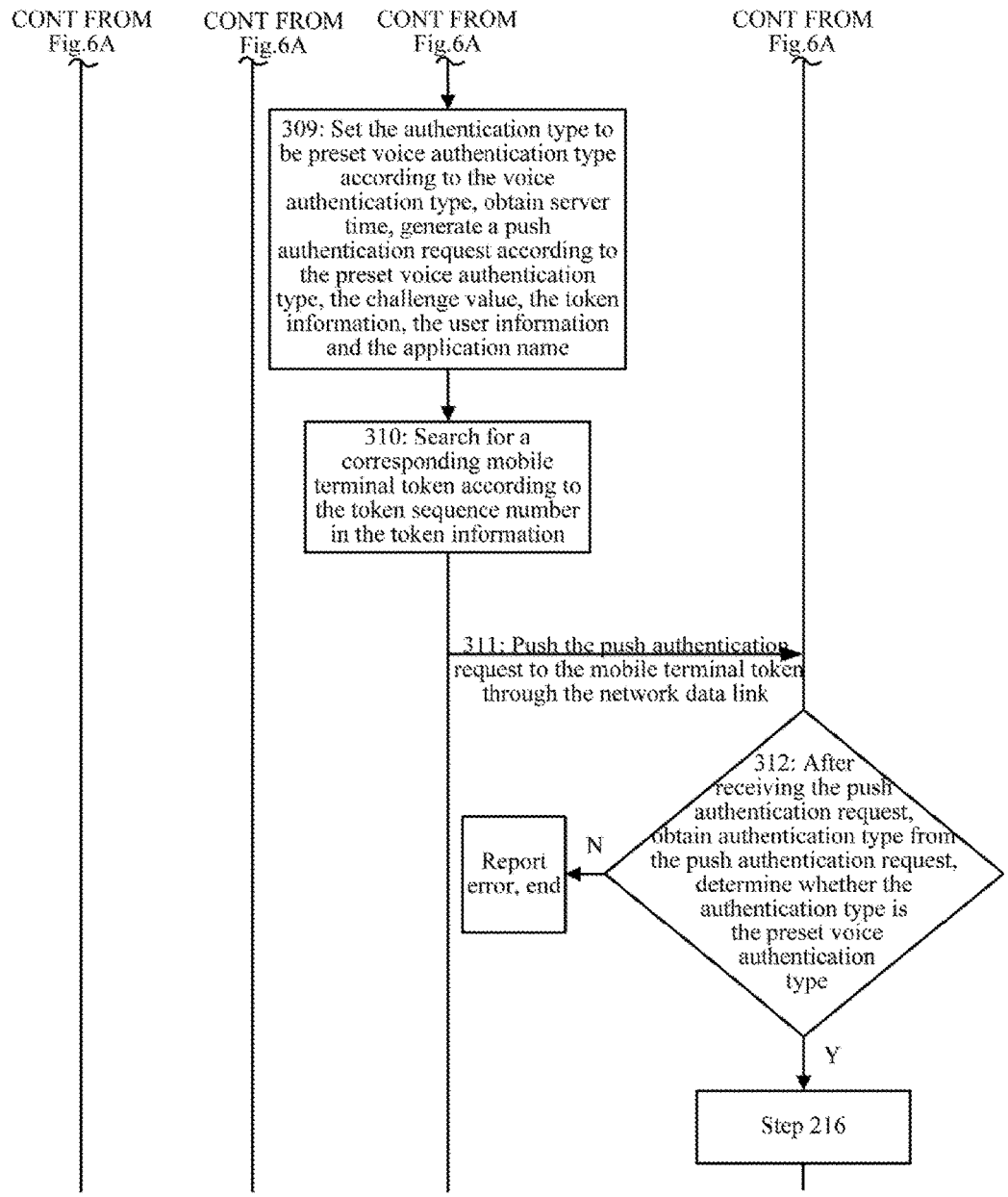

As shown by FIG. 6A and FIG. 6B, in the present embodiment, steps 201 to 215 can further be the following steps.

Step 301, the application interface receives the username and password input by the user, receives selection of authentication type made by the user. When the voice authentication type is selected, execute step 302, otherwise, execute other push authenticating, and end the procedure.

It should be noted that other push authenticating processes are not in the scope limited by the present invention.

Step 302, the application interface sends the user information and the voice authentication type to the application server.

Step 303, the application server determines whether the received username and password are correct, if yes, executes step 304; otherwise, ending the procedure.

Step 304, the application server generates an authentication request according to the username, the voice authentication type and the application identification stored inside.

Step 305, the application server sends the authentication request to the authentication server.

Step 306, after receiving the authentication request, the authentication server obtains the username, the voice authentication type and the application identification in the authentication request.

Step 307, the authentication server searches for corresponding token information and the network data link from the server storage area according to the username, obtains a corresponding application name from the server storage area according to the application identification.

Step 308, the authentication server generates a challenge value of preset length, builds association with the user information and stores the challenge value in the server storage area.

Step 309, the authentication server sets the authentication type to be preset voice authentication type according to the voice authentication type, obtains server time, generates a push authentication request according to the preset voice authentication type, the challenge value, the token information, the user information and the application name.

Step 310, the authentication server searches for a corresponding mobile terminal token according to the token sequence number in the token information.

Step 311, the authentication server pushes the push authentication request to the mobile terminal token through the network data link.

Step 312, after receiving the push authentication request, the mobile terminal token obtains the authentication type from the push authentication request, determines whether the authentication type is preset voice authentication type, if yes, executes step 216; otherwise, reports an error, ending procedure.

In the present embodiment, besides the transmission way of embodiments, communication data between the application interface and the application server, the application server and the authentication agency, the authentication proxy and the authentication server, the authentication server and the mobile terminal token is processed with the algorithm and the key that are negotiated by both sides in advance; further, the communication data between them can include length and check bit; a receiving side determines whether the received communication data is correct by the length and the check bit in the communication data, if the communication data is correct, normal operating process is executed; if the communication data is not correct, a sending side will be informed of data error and the sending side will resend communication data; further, the communication data between them can be processed such as being encrypted through network or being transferred by using private software, so as to assure security of the communication data between the application server and the interactive interface.

Embodiment 3

Figure 7:
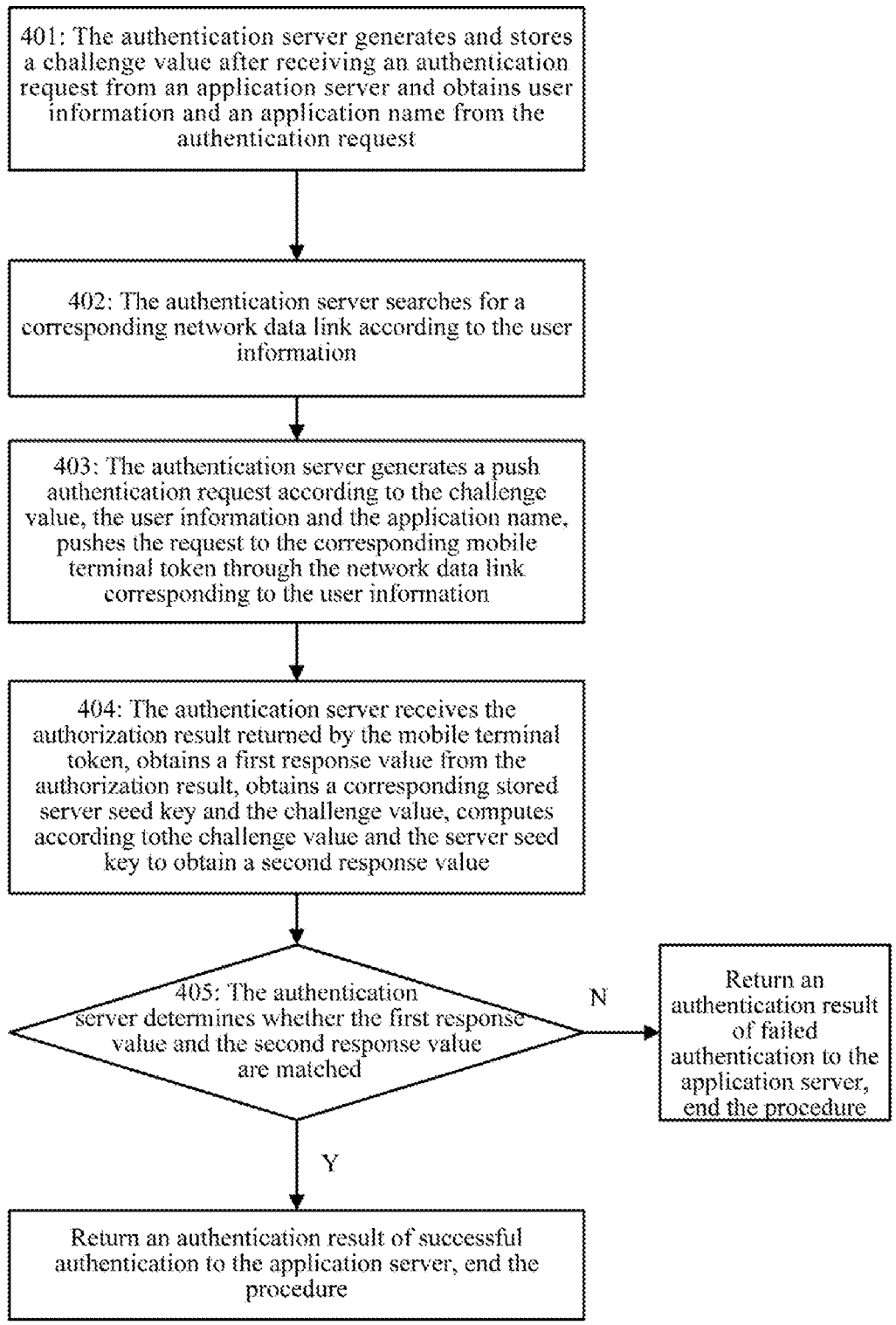
FIG. 7 is a flow chart of a working method of an authentication server in a voice authentication system provided by Embodiment 3 of the present invention.

Embodiment 3 of the present invention provides a working method of an authentication server in a voice authentication system; as shown by FIG. 7, the working method includes:

Step 401, the authentication server generates and stores a challenge value after receiving an authentication request from an application server and obtains user information and an application name from the authentication request.

In Embodiment 3, generating the challenge value specifically includes: invoking a random number generating function, generating a random number, taking the random number as the challenge value; or obtaining a corresponding stored server seed key according to the user information in the authentication request, computing according to the server seed key and generating the challenge value.

Step 402, the authentication server searches for a corresponding network data link according to the user information.

Step 402 further includes that the authentication server obtains corresponding token information according to the user information.

Further, searching for the corresponding network data link according to the user information specifically includes: determining whether the corresponding network data link can be found according to the user information, if yes, finding the corresponding network data link; otherwise, returning an error response to the application server, ending the procedure.

Step 403, the authentication server generates a push authentication request according to the challenge value, the user information and the application name, pushes the request to the corresponding mobile terminal token through the network data link corresponding to the user information.

Step 403 specifically includes that: the authentication server generates the push authentication request according to the challenge value, the token information, the user information and the application name, pushes the push authentication request to the mobile terminal token through the network data link.

In step 403, generating the push authentication request according to the challenge value, the user information and the application name further includes that: the authentication server uses a token identification code to encrypt the challenge value, obtains cipher text of the challenge value, generates the push authentication request according to the cipher text of the challenge value, token information, user information and the application name.

In this case, the token information includes the token sequence number; pushing the push authentication request to the mobile terminal token specifically includes that the authentication server obtains a corresponding mobile terminal token according to the token sequence number, pushes the push authentication request to the mobile terminal token.

Step 404, the authentication server receives an authorization result returned by the mobile terminal token, obtains a first response value from the authorization result, obtains a corresponding stored server seed key and challenge value, computes according to the challenge value and the server seed key to obtain a second response value.

In Embodiment 3, computing according to the challenge value and the server seed key to obtain the second response value specifically includes: obtaining current server time, using a preset password generating algorithm, computing according to the current server time, the challenge value, the server seed key and a dynamic factor to obtain the second response value.

Step 405, the authentication server determines whether the first response value and the second response value are matched; if yes, returns an authentication result of successful authentication to the application server, ending the procedure; otherwise, returns an authentication result of failed authentication to the application server, ending the procedure.

Embodiment 4

Figure 8:
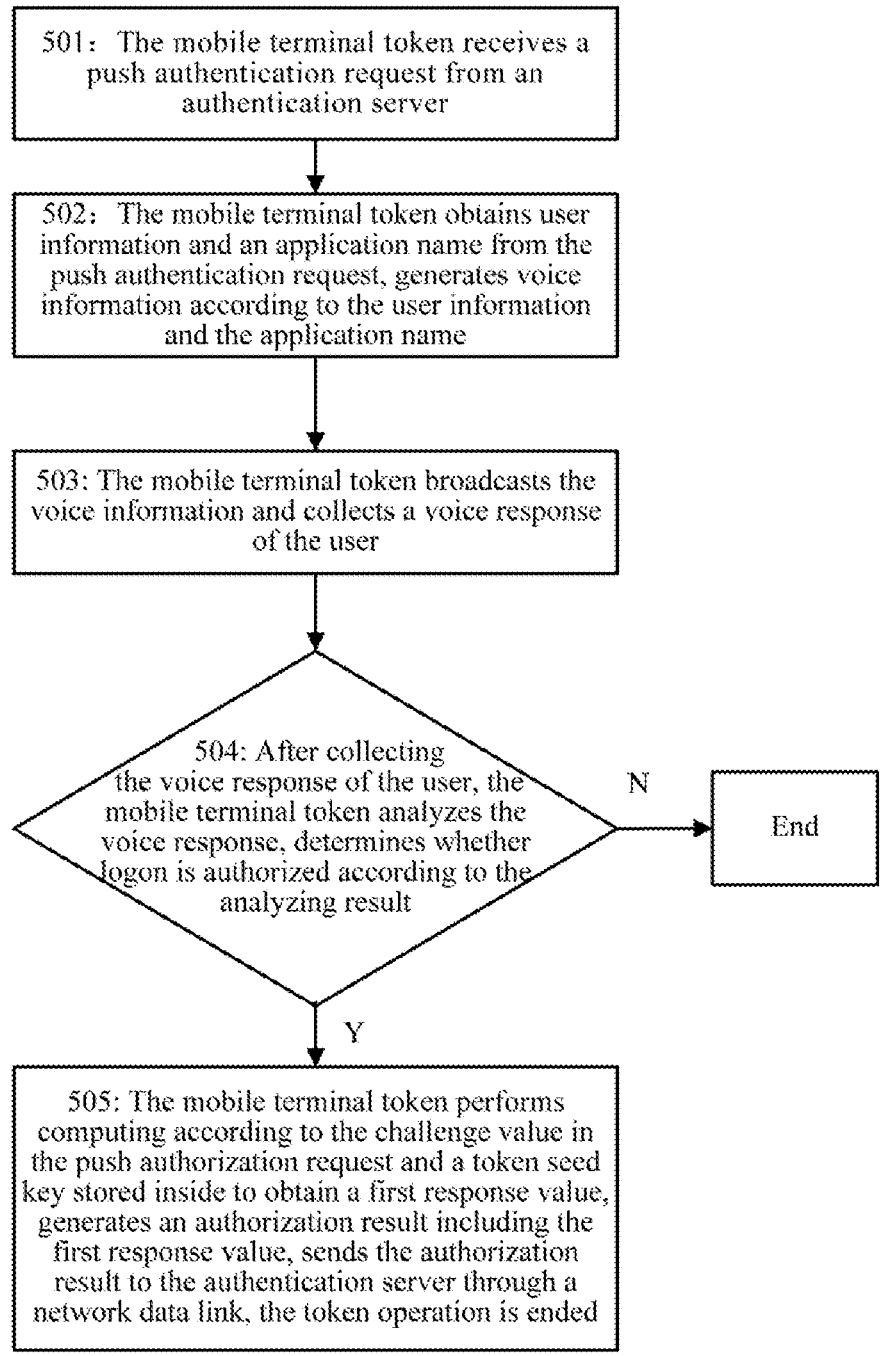
FIG. 8 is a flow chart of a working method of a mobile terminal token in a voice authentication system provided by Embodiment 4 of the present invention.

Embodiment 4 of the present invention provides a working method of a mobile terminal token in a voice authentication system; as shown by FIG. 8, the method includes following steps.

Step 501, the mobile terminal token receives a push authentication request from an authentication server.

Step 502, the mobile terminal token obtains user information and an application name from the push authentication request, generates voice information according to the user information and the application name.

Step 503, the mobile terminal token broadcasts the voice information and collects a voice response of a user.

Step 504, after collecting the voice response of the user, the mobile terminal token analyzes the voice response, determines, according to an analyzing result, whether logon is authorized, if yes, executes step 505; otherwise, end the procedure.

In the present embodiment, determining, according to the analyzing result, whether logon is authorized specifically includes that the mobile terminal token determines whether the analyzing result is preset authorization logon information, if yes, executes step 505; otherwise, end the procedure.

In the present embodiment, step 502 to step 504 specifically include:

Step a1, the mobile terminal token obtains the challenge value, the user information and the application name from the push authentication request.

Step a2, the mobile terminal token generates the voice information according to the challenge value, the user information and the application name, broadcasts the voice information and collects the voice response of the user.

Step a2 specifically includes that: the mobile terminal token obtains the challenge value from the push authentication request, obtains data on the preset bit of the challenge value, takes the data as first match data, generates the voice information according to the first match data, the user information and the application name, broadcasts the voice information and collects the voice response of the user;

or, the mobile terminal token obtains the challenge value from the push authentication request, performs preset computing on the challenge value to generate second match data, generates the voice information according to the second match data, the user information and the application name, broadcasts the voice information and collects the voice response of the user;

or, the mobile terminal token obtains the challenge value from the push authentication request, generates the voice information according to the challenge value, the user information and the application name, broadcasts the voice information and collects the voice response of the user.

Step a3, after collecting the voice response of the user, the mobile terminal token analyzes the voice response, determines whether the analyzing result matches the challenge value, if yes, authorizes logon, executes step 505; otherwise, end the procedure.

In step a2, determining whether the analyzing result matches the challenge value specifically includes: determining whether the analyzing result matches the first match data, if yes, authorizing logon and executing step 505; otherwise, ending the procedure;

it specifically includes: determining whether first data which is identical to the first match data exists in the analyzing result, determining whether a preset character exists before the first data and after the first data, if yes, executing step 505; otherwise, ending the procedure;

or, determining whether the analyzing result matches the second match data, if yes, authorizing logon and executing step 505; otherwise, ending the procedure;

it specifically includes: determining whether second data which is identical to the second match data exists in the analyzing result, determining whether the preset character exists before the second data and after the second data, if yes, executing step 505, otherwise, ending the procedure;

or, determining whether the analyzing result matches the challenge value, if yes, authorizing logon, executing step 505; otherwise, ending the procedure.

Step 505, the mobile terminal token performs computing according to the challenge value in the push authentication request and the token seed key stored inside to obtain a first response value, generates an authorization result including the first response value, sends the authorization result to the authentication server through the network data link, the token operation is ended.

In the present embodiment, step 504 analyzes the voice response, determines, according to the analyzing result, whether the logon is authorized specifically includes:

Step 1, the mobile terminal token monitors the collected voice data at an interval of preset duration, determines whether the length of the collected audio data changes, if yes, executes step 2; otherwise, executes step 3.

Step 2, the mobile terminal token analyzes the collected voice data, obtains the analyzing result, determines, according to the analyzing result, whether logon is authorized, if yes, executes step 505; otherwise, executes step 3.

Step 3, the mobile terminal token determines whether the recording time reaches a preset time length, if yes, outputs prompt information indicating that the voice response is incorrect, ending the procedure, otherwise, go back to step 1.

In the several embodiments provided in this application, it should be understood that the disclosed system, device, and method may be implemented in other manners. For example, the described device embodiments are merely exemplary. For example, the unit division is merely logical function division and there may be other division manners in actual implementations. For example, multiple units or components may be combined, or may be integrated into another system, or some features can be ignored or not performed. Furthermore, the shown or discussed coupling or direct coupling or communication connection may be indirect coupling or communication connection through some interfaces, devices or units, which may be electrical, mechanical, or in other forms.

Units described as separate components may be or may not be physically separated. Components shown as units may be or may not be physical units, that is, may be located in one place or may be distributed to a plurality of network units. Part or all of the units may be selected to achieve the objective of the solution in the embodiments according to actual requirements.

In addition, functional units in each embodiment of the present disclosure may be integrated in one processing module or each unit may exist physically separately, or two or more units may also be integrated in one unit. The integrated unit above can be implemented in form of hardware and the integrated unit above can be implemented in form of hardware and software function unit.

If the functions are implemented in a form of a software functional unit, the functions may be stored in a computer readable storage medium. The computer software product may be stored in a storage medium, and include several instructions for making a computer device (for example, a personal computer, a server, or a network device) or a processor perform part of the steps of the methods described in the embodiments of the present disclosure. The storage medium includes various non-transitory media capable of storing program codes, such as a flash disk, a mobile hard disk, a Read-Only Memory (ROM, Read-Only Memory), a Random Access Memory (RAM, Random Access Memory), a magnetic disk or an optical disk.

Persons skilled in the art can clearly understand that, for the purpose of convenient and brief description, the separation of respective function modules above are for example only, in real practice, the function allocation above can be implemented by different functional modules according to requirements, i.e., the internal structure of the device is divided into different functional modules to complete part or all of the functions described above. For a detailed working process of the device described above, reference may be made to the corresponding process in the foregoing method embodiments, and the details will not be described herein again.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A working method of a voice authentication system, which is applied in a system comprising an application interface, an application server, an authentication server and a mobile terminal, wherein when a user accesses an application, the method comprises:
    step S1, receiving, by the application interface, user information input by the user, sending the user information to the application server;
    step S2, after receiving the user information, generating, by the application server, an authentication request according to the user information and an internally stored application name, sending the authentication request to the authentication server;
    step S3, after receiving the authentication request, generating, by the authentication server, a challenge value and storing the challenge value, obtaining the user information and the application name from the authentication request;

step S4, generating, by the authentication server, a push authentication request according to the challenge value, the user information and the application name, pushing the push authentication request to a corresponding mobile terminal via a network data link corresponding to the user information;

step S5, after receiving the push authentication request, generating, by the mobile terminal, voice information according to the user information and the application name in the push authentication request;

step S6, broadcasting, by the mobile terminal, the voice information, collecting a voice response of the user;

step S7, after collecting the voice response of the user, determining, by the mobile terminal and according to the voice response, whether logon is authorized, if yes, executing step S8; otherwise, ending the procedure;

step S8, obtaining, by the mobile terminal, a first response value by computing according to the challenge value in the push authentication request and an internally stored token seed key, generating an authorization result comprising the first response value, sending the authorization result to the authentication server via the network data link;

step S9, after receiving the authorization result, obtaining, by the authentication server, the first response value from the authorization result, obtaining a stored server seed key and the challenge value, obtaining a second response value by computing according to the challenge value and the server seed key;

step S10, determining, by the authentication server, whether the first response value and the second response value are matched, if yes, sending an authentication result of successful authentication to the application server, executing step S11; otherwise, sending an authentication result of failed authentication to the application server, executing step S11;

step S11, determining, by the application server, the received authentication result, if the authentication result is successful authentication, permitting the user to access the application, if the authentication result is failed authentication, forbidding the user to access the application.

2. The method according to claim 1, wherein in step S7, determining, according to the voice response, whether logon is authorized specifically comprises: determining, by the mobile terminal, whether the voice response is preset authorization logon information, if yes, executing step S8; otherwise, ending the procedure.

3. The method according to claim 1, wherein step S5 to step S7 specifically comprise:
step a1, obtaining, by the mobile terminal, the challenge value, the user information and the application name from the push authentication request;
step a2, generating, by the mobile terminal, the voice information according to the challenge value, the user information and the application name, broadcasting the voice information, collecting the voice response of the user;
step a3, after collecting the voice response of the user, determining, by the mobile terminal, whether the voice response and the challenge value are matched, if yes, authorizing logon, executing step S8; otherwise, ending the procedure.

4. The method according claim 1, wherein step S7 specifically comprises:
step S7-1, monitoring, by the mobile terminal, the collected voice response of the user at an interval of preset duration, determining whether a length of the collected voice response of the user changes, if yes, executing step S7-2; otherwise, executing step S7-3;
step S7-2, analyzing, by the mobile terminal, the collected voice response of the user to obtain an analyzing result, determining, according to the analyzing result, whether logon is authorized, if yes, executing step S8; otherwise, executing step S7-3;
step S7-3, determining, by the mobile terminal, whether recording time reaches a preset time length, if yes, outputting prompt information of an incorrect voice response, ending the procedure; otherwise, going back to step S7-1.

5. The method according to claim 1, wherein,
before step S6, the method further comprises: setting, by the mobile terminal, a number of times of a voice broadcasting error to be an initial value;
step S7 further comprises:
step d1, determining, by the mobile terminal, whether the voice response of the user is received in preset time, if yes, analyzing the voice response; otherwise, executing step d2;
step d2, determining, by the mobile terminal, whether the number of times of the voice broadcasting error reaches a preset number of times, if yes, ending the procedure; otherwise, updating the number of times of the voice broadcasting error, going back to step S6.

6. The method according to claim 1, wherein in step S5, after receiving, by the mobile terminal, the push authentication request, the method further comprises: obtaining an authentication type from the push authentication request, determining the authentication type, if the authentication type is a preset voice authentication type, continuing the procedure; otherwise, executing authentication of a corresponding type.

7. The method according to claim 1, wherein,
step S1 specifically comprises: receiving, by the application interface, the user information input by the user, receiving a selection of an authentication type made by the user, sending the user information and a voice authentication type to the application server when the user selects the voice authentication type;
step S2 specifically comprises: generating, by the application server, the authentication request according to the voice authentication type, the user information and an internally stored application identification, sending the authentication request to the authentication server;
step S4 specifically comprises: setting, by the authentication server, the authentication type to be the preset voice authentication type according to the voice authentication type in the authentication request, generating the push authentication request according to the preset voice authentication type, the challenge value, the user information and the application name;
after receiving the push authentication request, step S5 further comprises: obtaining, by the mobile terminal, the authentication type from the push authentication request, determining whether the authentication type is the preset voice authentication type, if yes, continuing the procedure; otherwise, reporting an error, ending the procedure.

8. The method according to claim 1, wherein the method further comprises: when the mobile terminal is activated, accessing the authentication server according to an internally stored access address, building the network data link between the mobile terminal and the authentication server.

9. The method according to claim 1, wherein generating the challenge value in step S3 specifically comprises: invoking, by the authentication server, a random number generating function to generate a random number, taking the random number as the challenge value; or obtaining, by the authentication server, a corresponding stored server seed key according to the user information in the authentication request, computing according to the server seed key to obtain the challenge value.

10. The method according to claim 1, wherein,
in step S2, generating the authentication request according to the user information and the internally stored application name is replaced by: generating, by the application server, the authentication request according to the user information and the internally stored application identification;
in step S3, obtaining the user information and the application name from the authentication request specifically comprises: obtaining the application identification form the authentication request, obtaining the corresponding application name according to the application identification.

11. The method according to claim 1, wherein,
in step S4, generating the push authentication request according to the challenge value, the user information and the application name specifically comprises: generating, by the authentication server, an authentication request ID, building relevance of the authentication request ID to the user information and storing the authentication request ID, generating the push authentication request according to the challenge value, the user information, the application name and the authentication request ID;
in step S8, generating the authorization result comprising the first response value specifically comprises: generating the authorization result comprising the first response value and the authentication request ID;
before step S9, the method further comprises: obtaining, by the authentication server, the authentication request ID from the authorization result, obtaining the stored authentication request ID, determining whether the authentication request ID in the authorization result is identical to the stored authentication request ID, if yes, executing step S9; otherwise, deleting the stored authentication request ID, ending the procedure.

12. A working method of a mobile terminal in a voice authentication system, comprising:
step K1, receiving, by the mobile terminal, a push authentication request from an authentication server;
step K2, obtaining, by the mobile terminal, user information and an application name from the push authentication request, generating voice information according to the user information and the application name;
step K3, broadcasting, by the mobile terminal, the voice information, collecting a voice response of a user;
step K4, after collecting the voice response of the user, determining, by the mobile terminal and according to the voice response, whether logon is authorized, if yes, executing step K5; otherwise, ending the procedure;
step K5, obtaining, by the mobile terminal, a first response value by computing according to a challenge value in the push authentication request and an internally stored token seed key, generating an authorization result comprising the first response value, sending the authorization result to the authentication server via a network data link, ending operations of the token;
wherein step K4 specifically comprises:
step K4-1, monitoring, by the mobile terminal, the collected voice response of the user at an interval of preset duration, determining, whether a length of the collected voice response of the user changes, if yes, executing step K4-2; otherwise, executing step K4-3;
step K4-2, analyzing, by the mobile terminal, the collected voice response of the user to obtain an analyzing result, determining, according to the analyzing result, whether logon is authorized, if yes, executing step K5; otherwise, executing step K4-3;
step K4-3, determining, by the mobile terminal, whether recording time reaches a preset time length, if yes, outputting prompt information of an incorrect voice response; ending the procedure; otherwise, going back to step K4-1.

13. The method according to claim 12, wherein determining, according to the voice response, whether logon is authorized specifically comprises: determining, by the mobile terminal, whether the voice response is preset authorization logon information, if yes, shutting down recording, executing step K5; otherwise, ending the procedure.

14. The method according to claim 12, wherein step K2 to step K4 specifically comprise:
step a1, obtaining, by the mobile terminal, the challenge value, the user information and the application name from the push authentication request;
step a2, generating, by the mobile terminal, the voice information according to the challenge value, the user information and the application name, broadcasting the voice information and collecting the voice response of the user;
step a3, after collecting the voice response of the user, determining, by the mobile terminal and according to the voice response, whether logon is authorized, if yes, authorizing logon, executing step K5; otherwise, ending the procedure.

15. The method according to claim 12, wherein the method further comprises:
in response to the mobile terminal being activated, accessing the authentication server according to an internally stored access address, building the network data link between the mobile terminal and the authentication server.

* * * * *